(12) United States Patent
Kawai et al.

(10) Patent No.: US 8,405,348 B2
(45) Date of Patent: Mar. 26, 2013

(54) CHARGING CIRCUIT

(75) Inventors: Akira Kawai, Hikone (JP); Masaaki Sakaue, Hikone (JP)

(73) Assignee: Panasonic Electric Works Power Tools Co., Ltd. (JP)

( * ) Notice: Subject to any disclaimer, the term of this patent is extended or adjusted under 35 U.S.C. 154(b) by 311 days.

(21) Appl. No.: 12/805,905

(22) Filed: Aug. 24, 2010

(65) Prior Publication Data

US 2011/0043166 A1   Feb. 24, 2011

(30) Foreign Application Priority Data

Aug. 24, 2009   (JP) .................................. 2009-193649

(51) Int. Cl.
*H02J 7/00* (2006.01)
(52) U.S. Cl. ....................................................... 320/112
(58) Field of Classification Search .................... 320/112
See application file for complete search history.

(56) References Cited

U.S. PATENT DOCUMENTS

| | | | |
|---|---|---|---|
| 6,018,227 A | 1/2000 | Kumar et al. | |
| 6,181,103 B1 | 1/2001 | Chen | |
| 2003/0015993 A1* | 1/2003 | Misra et al. | 320/125 |
| 2005/0017679 A1 | 1/2005 | Tashiro | |
| 2005/0201049 A1* | 9/2005 | Osaka | 361/683 |
| 2007/0108945 A1 | 5/2007 | Ohashi et al. | |
| 2007/0244471 A1 | 10/2007 | Malackowski | |
| 2008/0122935 A1* | 5/2008 | Ohmura et al. | 348/207.1 |
| 2009/0153103 A1* | 6/2009 | Ikeuchi et al. | 320/152 |
| 2010/0264877 A1 | 10/2010 | Ashida | |

FOREIGN PATENT DOCUMENTS

| | | |
|---|---|---|
| EP | 1291999 | 3/2003 |
| JP | H07307168 | 11/1995 |
| JP | 2007-143279 | 6/2007 |
| JP | 2007-325324 | 12/2007 |
| WO | WO/2009/057404 | 5/2009 |

OTHER PUBLICATIONS

European Search Report dated Aug. 3, 2012.

* cited by examiner

*Primary Examiner* — Arun Williams
(74) *Attorney, Agent, or Firm* — Bacon & Thomas, PLLC

(57) ABSTRACT

A charging circuit includes a battery pack provided with one or more secondary batteries and a battery charger for charging the secondary batteries, the battery pack being detachably attachable to the battery charger. The charging circuit further includes a control unit for performing a charging control, a monitoring unit for detecting charged voltage of the secondary batteries to determine completion of charging, a storage unit storing charging data for use in the charging control of the control unit and determination of the charging completion of the monitoring unit and a changing unit for changing the charging data. The monitoring unit and the storage unit are arranged in the battery pack, and the changing unit and the control unit are arranged in the battery charger.

10 Claims, 4 Drawing Sheets

CHARGING CIRCUIT

FIELD OF THE INVENTION

The present invention relates to a charging circuit; and, more particularly, to a charging circuit including a battery pack provided with secondary batteries and a battery charger to which the battery pack is detachably attached. Even more particularly, the present invention pertains to a safety control of a charging circuit for preventing overcharge which would otherwise occur when charging a battery pack of an electric power tool.

BACKGROUND OF THE INVENTION

Conventionally, a battery pack containing secondary batteries has been used as a power source of a handheld electric power tool. A charging circuit for charging the secondary batteries is formed by attaching the battery pack to a dedicated battery charger. In the charging circuit, the secondary batteries are charged with electric power supplied from the outside. The charging circuit for charging the secondary batteries includes a charging unit for rectifying the electric power supplied from the outside and boosting the voltage, a control unit for performing the charging control of the charging unit, a voltage monitoring unit for monitoring the charged voltage of the secondary batteries and a storage unit storing charging data for use in the charging control and the voltage monitoring. The charging data includes a charging setting for the charging control such as an amount of an electric current supplied during a charging operation, a voltage value available during a constant voltage charging process, etc.; and a control voltage value, i.e., an upper limit of a charged voltage, to determine whether the secondary batteries are fully charged.

In keeping with the diversification of the kind of the secondary batteries and the charging capacity of the battery pack, the control unit detects a configuration setting, e.g., the kind of the secondary batteries, from the battery pack attached to the battery charger and performs the charging control by using the charging data corresponding to the respective configuration setting thus detected. In view of this, the battery pack is provided with a storage unit which stores the charging data, and the control unit performs the charging control by reading the charging data stored in the storage unit. There is also known a battery pack which stores plural kinds of charging data in its storage unit to enable appropriate charging data to be used adaptably depending on the kind of the battery charger or the number of charging times.

During the charging operation, the charged voltage monitoring unit detects the electric charges accumulated in a secondary battery from the output voltage thereof, and outputs an electric signal to the control unit if the potential (i.e., charged voltage) of the secondary battery reaches a control voltage. The control unit 2 determines, upon receiving the electric signal, that the secondary battery is fully charged and terminates the charging operation.

Further, there is a demand to shorten the charging time of the secondary battery. The charging time can be shortened by performing such a charging control as to supply a large amount of electric current immediately after starting a charging operation.

In case of supplying the large amount of electric current immediately after starting the charging operation, however, there may be the case that, if a battery pack in a full charge condition or in a near-full-charge condition is attached to a battery charger, the large amount of electric current is supplied to the secondary batteries of the battery pack prior to detection of the full charge condition, eventually overcharging the secondary batteries.

Further, an electric power tool employing a battery pack as its power source is often used in high-load works such as boring or the like. Since the battery pack is caused to discharge a large amount of electric current during the high-load works, there may be the case that the secondary batteries of the battery pack are overheated due to such discharge and comes into a high temperature state. When charging a secondary battery kept at high temperature, a rated amount of electric charges may not be normally accumulated in the secondary battery. Therefore, such a secondary battery kept at the high temperature may be overcharged if it accumulates the same amount of electric charges as in the secondary battery kept at a normal temperature without being overheated.

If the secondary battery is overcharged as mentioned above, the battery cell of the secondary battery is degraded, which reduces total charging capacity of the secondary battery. Therefore, the secondary battery may be overcharged and degraded even when the same amount of electric charges as that properly charged before the occurrence of overcharging is accumulated in the secondary battery. Degradation of the battery cell may lead to not only reduction of the total charging capacity but also easier generation of heat in the discharging and charging operations. In addition, the degradation of the battery cell may cause damage or fluid leakage to the secondary battery, thereby shortening the battery life span. In particular, the overcharging-caused degradation of battery cell appears more remarkably in a lithium-ion secondary battery than in a nickel-hydrogen secondary battery.

Taking this into account, there is known charging circuit of the type in which a safety control for preventing overcharging of a secondary battery is performed by reducing the amount of an electric current supplied to a battery pack immediately after starting a charging operation (that is, at an initial stage of a charging operation) or by reducing a control voltage used as a criterion for determination of charging completion according to the number of times of overcharged states experienced by the battery pack.

For example, Japanese Patent Application Publication No. 2007-143279 discloses a charging circuit in which a safety control is performed by reducing the amount of an electric current supplied to a battery pack at an initial stage of a charging operation. In this charging circuit, extension of the charging time and overcharging of secondary batteries immediately after starting a charging operation are prevented by reducing the amount of an electric current supplied to a battery pack at an initial stage of a charging operation and by increasing the amount of an electric current supplied to the battery pack as the charging time lapses.

Further, as another example, Japanese Patent Application Publication No. 2007-325324 discloses a charging circuit in which a safety control is performed by reducing a control voltage according to the number of times of overcharged states experienced by a battery pack. In this charging circuit, the number of occurrences of overcharged and overheated states experienced during charging operations is stored in a battery pack, and the degree of degradation of secondary batteries is obtained based on the number of occurrences by a charging control determination unit in the battery pack. Thereafter, a charging control unit reduces the control voltage, i.e., potential of the secondary batteries at the completion of charging operation based on the obtained result to prevent overcharging of the degraded battery pack.

In addition, there is known a charging circuit of the type in which a temperature detection unit for detecting the temperature of a secondary battery is provided in a battery pack. If the temperature detected by the temperature detection unit is equal to or higher than a specified temperature (if the secondary battery is in a high temperature state), charging is started after the battery pack is cooled by a cooling unit. In this way, overcharging is prevented by inhibiting the battery pack from being charged in an overheated state.

However, the charging circuit disclosed in Japanese Patent Application Publication No. 2007-143279 is designed to only prevent overcharging immediately after starting a charging operation and may perform overcharging with respect to a battery pack having a degraded battery cell or a battery pack attached to a battery charger in a high temperature state. The charging circuit disclosed in Japanese Patent Application Publication No. 2007-325324 is capable of preventing overcharging of a battery pack having a degraded battery cell but may perform overcharging with respect to a battery pack attached to a battery charger in a high temperature state. In the charging circuit of the type in which charging is started after cooling the battery pack, overcharging may be performed with respect to a degraded battery pack. Moreover, the charging time is prolonged due to the addition of the cooling time.

As discussed above, there exists no charging circuit capable of performing a charging operation according to the presence or absence of battery cell degradation and the change in the temperature of a secondary battery, both of which are causes of overcharging of a battery pack. In particular, there exists no charging circuit capable of performing a charging control according to the temperature change of a secondary battery without prolonging the charging time. Thus, the conventional charging circuits suffer from a problem in that they are inconvenient to use. In the battery pack for electric power tools, overcharging may occur because the charging data stored in the storage unit cannot cope with the case where the secondary battery is considerably degraded by repeating a high-load work and a job-site charging task or the case where charging is performed under a peculiar environment, e.g., within a freezing compartment as a job site in which the temperature of the secondary battery becomes lower than the normal (room) temperature.

SUMMARY OF THE INVENTION

In view of the above, the present invention provides a charging circuit capable of reliably preventing overcharging of a battery pack kept in a degraded state or a abnormal temperature state without prolonging the charging time and capable of enhancing the safety and ease of use when charging a secondary battery.

In accordance with an embodiment of the present invention, there is provided a charging circuit including: a battery pack provided with one or more secondary batteries; a battery charger for charging the secondary batteries, the battery pack being detachably attachable to the battery charger; a control unit for performing a charging control; a monitoring unit for detecting charged voltage of the secondary batteries to determine completion of charging; a storage unit storing charging data for use in the charging control of the control unit and determination of the charging completion of the monitoring unit; and a changing unit for changing the charging data, wherein the monitoring unit and the storage unit are arranged in the battery pack, and the changing unit and the control unit are arranged in the battery charger.

With this configuration, the charging data stored in the battery pack can be changed by the changing unit. Therefore, the charging data can be changed to be adapted with the degree of degradation of the battery cell or the temperature of the secondary battery in the battery pack mounted on the battery charger.

As set force above, the charging circuit of the embodiment of the present invention is capable of changing the charging data stored in the storage unit. This makes it possible to change the charging data according to the temperature change of the battery pack attached to the battery charger for charging purposes or the degree of degradation of the battery cell. Since the charging data used in charging the battery pack are adaptable with the state of the battery pack, it is possible to perform the charging with the charging settings and the control voltage suitable for the state of the battery pack to be charged. This makes it possible to prevent overcharging of the battery pack. In other words, the charging data can be rewritten by the changing unit in the battery charger according to the state of the battery pack, e.g., the temperature or the degree of degradation of the battery pack. Therefore, even if the charging data stored in the battery pack cannot avoid occurrence of overcharging, it is possible to perform the charging with no likelihood of overcharging because the changing unit changes the charging data depending on the state of the battery pack.

As a consequence, it is possible to prevent occurrence of trouble, e.g., damage, in the battery pack, which would otherwise be caused by the overcharging. This helps prevent reduction of the battery life span and enhance the safety and the ease of use. The changed charging data is left in the battery pack because the charging data stored in the storage unit is rewritten by the changing unit. Therefore, even when trouble occurs in the charging data, the charging data can be corrected with ease. This helps enhance the ease of maintenance.

Further, the changing unit may change the charging data depending on a temperature of the secondary batteries of the battery pack.

With this configuration, the charging operation can be changed to the one that corresponds to the temperature of the secondary battery by changing the charging data based on the temperature. In other words, even if the charging data for preventing occurrence of overcharging on the occasion of temperature abnormality is not provided in the battery pack due to the limited storage capacity or the increase in the production cost, the charging data can be changed to the one that corresponds to the temperature abnormality because new charging data for preventing occurrence of overcharging is written into the storage unit by the changing unit. This makes it possible to reliably perform the charging depending on the temperature of the battery pack. As a result, it is possible to prevent occurrence of overcharging which would otherwise be caused by the temperature abnormality, which assists in enhancing the safety and the ease of use.

Further, the charging data may include a control voltage, which is an upper limit of the charged voltage used in the determination made by the monitoring unit, and charging settings for the charging control and the determination, the changing unit changing the charging data by adding a new charging control to the charging settings.

With this configuration, since a new charging control is added to the charging settings of the charging data, the temperature elevation can be suppressed by calculating the control voltage based on the temperature at the charging startup time or by reducing the supply amount of current based on the degree of degradation or the temperature. In other words, since the content of the charging control can be expanded at the charging time, it is possible to more accurately perform the charging according to the degree of degradation or the temperature. This helps further enhance the safety and the ease of use.

Further, the changing unit may change the charging data depending on the number of occurrences of charging operation of the battery pack.

With this configuration, the charging data can be changed to the one that corresponds to the charging-dependent degradation of the battery cell by changing the charging data according to the number of charging time. In other words, even if the charging data for preventing occurrence of overcharging otherwise caused by the charging-dependent degradation, e.g., the aging degradation of the battery cell, is not provided in the battery pack, the charging data can be changed to the one that corresponds to the degradation of battery pack because new charging data for preventing occurrence of degradation-caused overcharging is written into the storage unit by the changing unit. Therefore, it is possible to reliably perform the charging according to the degree of degradation of the battery pack, thereby preventing occurrence of degradation-caused overcharging. This helps further enhance the safety and the ease of use.

Further, the charging circuit described above may further include a data reception unit for receiving changing data from outside therethrough, the changing unit changing the charging data using the changing data received through the data reception unit.

With this configuration, since the changing data can be received from the outside of the charging circuit and the changing unit can change the charging data using the changing data thus received, it is possible for the changing unit to easily set and change the content such as the charging settings of the charging data or the timing of change.

Further, the charging circuit described above may further include a terminal mount unit to which an external storage terminal storing the changing data is removably mounted, the data reception unit receiving the changing data from the external storage terminal mounted to the terminal mount unit.

With this configuration, provision of the terminal mount unit for mounting the external storage terminal makes it possible for the data reception unit to reliably perform the reception of the changing data.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

Hereinafter, embodiments of the present invention will now be described with reference to the accompanying drawings, which form a part hereof.

Figure 1:
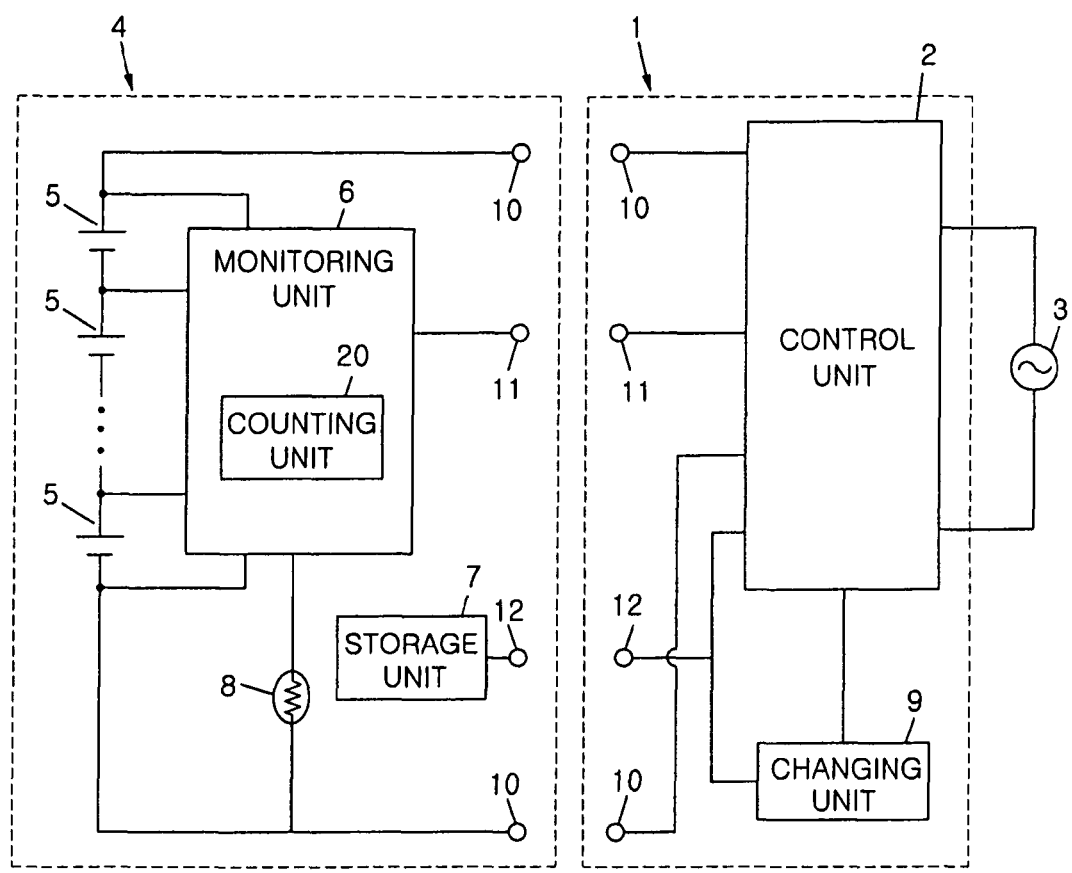
FIG. 1 is a circuit diagram showing a charging circuit in accordance with a first embodiment of the present invention.

Referring to FIG. 1, a charging circuit in accordance with a first embodiment of the present invention includes a battery charger 1 connected to an external power source 3 and a battery pack 4 detachably attached to the battery charger 1, wherein the charging circuit is provided to charge a plurality of secondary batteries 5 provided in the battery pack 4. Each of the battery charger 1 and the battery pack 4 of the charging circuit includes an operation circuit such as a microprocessor or the like. The operation circuit for the battery charger 1 serves as a control unit 2 for performing a charging control. The operation circuit for the battery pack 4 serves as a monitoring unit 6 for monitoring the charged voltages of the respective secondary batteries 5 through an operation process, which is a simple process compared to the charging control.

More specifically, the battery pack 4 includes, in addition to the secondary batteries 5 and the monitoring unit 6, a temperature detection unit 8 for detecting temperature of the secondary batteries 5 to output a temperature detection signal corresponding to the detected temperature to the monitoring unit 6; and a storage unit 7 storing the charging data for use in the charging control performed by the control unit 2 and the charged voltage monitoring performed by the monitoring unit 6. In addition to the monitoring of the charged voltage, the monitoring unit 6 monitors the temperature of the secondary batteries 5 during the charging operation based on the detected temperature from the temperature detection unit 8 and outputs a charging termination signal to the control unit 2 when detecting the temperature which reaches a value at which a battery cell undergo degradation. In order to avoid an erroneous operation at an elevated temperature caused by the heat generation during the charging and discharging operation of the battery pack 4, the storage unit 7 preferably includes a nonvolatile storage device such as an EEPROM (Electrically Erasable and Programmable Read Only Memory) or the like capable of rewriting stored data over and over.

The charging data are preset at the manufacturing stage of the battery pack 4. The charging data includes a constant control voltage set according to the charging capacity of the battery pack 4 regardless of the temperature of the secondary batteries 5; and charging settings inclusive of the charging-time operation programs of the control unit 2 and the monitoring unit 6. Examples of the charging settings include a charged voltage of the battery pack 4 for use as a reference voltage at which the charging operation is switched to constant-voltage charging; conditions under which electric signals are outputted from the monitoring unit 6 to the control unit 2 according to the charged voltage of the battery pack 4; contents of the electrical signals such as a pulse period, a voltage and a current; switching conditions under which the control unit 2 switches the operation of a charging unit by, e.g., adjusting the increasing rate of a current supply amount depending on the electric signals or the lapse of the charging time; and the switching contents under the switching conditions.

The battery charger 1 includes a charging unit (not shown) for performing rectifying and voltage boosting of the electric power supplied from the external power source 3, a control unit 2 for performing a charging control by controlling the charging unit based on the charging settings of the charging data and a changing unit 9 for modifying the charging data stored in the storage unit 7. The changing unit 9 changes the charging data by reading the charging data stored in the storage unit 7, generating new charging data having changed charging settings and a changed control voltage based on the charging data thus read and writing the new charging data in the storage unit 7. The changing unit 9 includes a storage unit (not shown) which stores changing data including a condition function, the number of charging times and a temperature threshold value, which are used in changing the charging data.

Further, the storage unit 7 may include not only a region in which the charging data are stored but also an empty region to which new data can be added, so that the storage unit 7 has a room in the storage capacity. In other words, when the charging data is changed by the changing unit 9, the storage unit 7 allows additional data to be added to the contents of the charging data within an extent storable in the empty region, thereby making it possible to change the charging control of the control unit 2 more adaptive to the battery pack 4.

For example, the control voltage of the storage unit 7 kept constant regardless of the temperature can be converted to a plurality of control voltages by calculating optimum control voltages adaptive to various temperatures of secondary batteries 5 and an operation program for changing the control voltage depending on the temperature of the secondary batteries 5 can be added to the charging settings to thereby change the charging data.

Specifically, the changing unit 9 reads the charging data from the storage unit 7. Then, the changing unit 9 calculates and determines the upper and lower limits of the charging temperature based on the charging data thus read. The changing unit 9 divides the temperature range between the upper and lower limits into, e.g., three temperature zones, i.e., a normal temperature zone (T2 through T3 in FIG. 2) in which charging can be normally performed up to the maximum charging capacity of the secondary batteries 5, a high temperature zone (T3 through T4 in FIG. 2) higher in temperature than the normal temperature zone, and a low temperature zone (T1 through T2 in FIG. 2) lower in temperature than the normal temperature zone. These temperature zones are added to the charging settings as temperature settings during the charging operation.

After adding the temperature settings to the charging settings, the upper limits of the voltages of the secondary batteries safely chargeable in the respective temperature zones of the temperature settings are calculated, so that the charging data is changed by rewriting the control voltage having been kept constant regardless of the temperature into a plurality of control voltages as new control voltages for the respective temperature zones.

Figure 2:
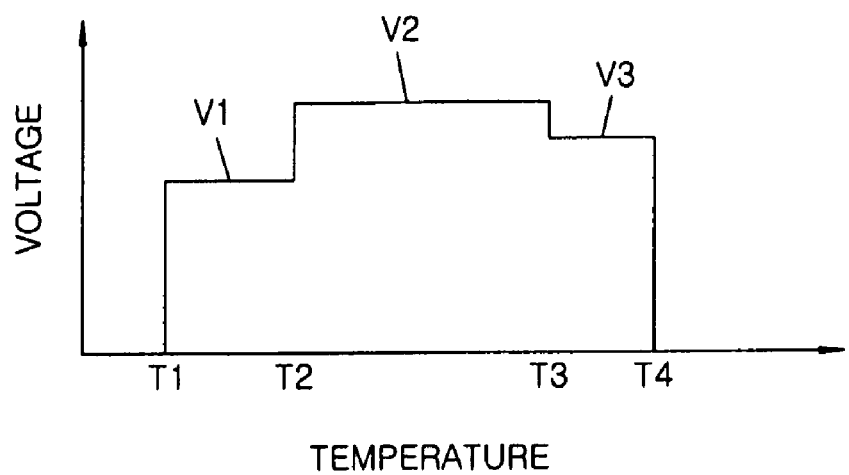
FIG. 2 is a view for explaining the charging data including control voltages corresponding to temperatures.

For example, as shown in FIG. 2, the normal temperature zone has the highest voltage value (V2) substantially equal to the control voltage previously stored in the storage unit 7. The high temperature zone has the intermediate voltage value (V3) and the low temperature zone has the lowest voltage value (V1). As the control voltages are increased in number, there is a need to select one of the new control voltages when charging the battery pack 4. For that reason, an operation program is added to the charging settings, the added operation program causing the control unit 2 to select and determine one control voltage according to the temperature of the secondary batteries 5 detected by the temperature detection unit 8.

In other words, since the changing unit 9 applies the aforementioned change to the charging data, each time when the charging operation is performed, one of the control voltages is selected and determined based on the temperature of the secondary batteries 5 attached to the battery charger 1. This makes it possible to perform an overcharging-free charging task depending on the temperature of the secondary batteries 5. The number of division of the temperature zones is not limited to three but may vary with the storage capacity of the storage unit 7 and the kind, number and charging capacity of the secondary batteries 5. The high temperature zone may be further divided into subordinate zones.

The battery charger 1 and the battery pack 4 are electrically connected to each other by charging connectors 10 through which to supply electric power to the secondary batteries 5, signal connectors 11 through which to output the electric signals of the monitoring unit 6 to the control unit 2 and data connectors 12 through which the charging data stored in the storage unit 7 is read out to the batter charger 1. In particular, the data connector 12 of the battery charger 1 is branched into two, which are connected to the control unit 2 and the changing unit 9, respectively. The data connector 12 of the battery charger 1 is also used for the changing unit 9 to rewrite the charging data stored in the storage unit 7.

Various types of connectors can be used as the connectors for interconnecting the battery charger 1 and the battery pack 4 as long as they are electrically connectable to deliver electric signals and electric power therethrough. It may be possible to use, as the connectors, non-contact transformers each having a primary coil at one side and a secondary coil at the other side.

The monitoring unit 6 in the battery pack 4 may include a counting unit 20 for counting the total number of occurrences of charging operation, in which case the changing unit 9 can change the charging data stored in the storage unit 7 based on the counted number. For example, as the number of occurrences of charging operation gets increased, the aging degradation of the battery cell becomes remarkable and the overcharging is likely to occur. If the counted number reaches the number of occurrences of charging operation corresponding to the end period of life span of the battery pack 4 in which the aging degradation of the battery cell becomes remarkable, the changing unit 9 writes new charging data in the storage unit 7 of the battery pack 4 to prevent overcharging of the battery pack 4 arriving at the end period of life span.

Figure 3:
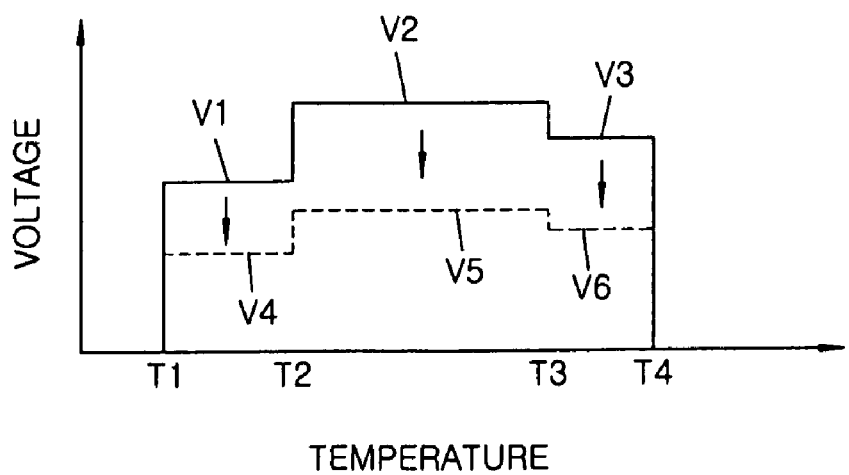
FIG. 3 is a view for comparing the charging data (indicated by a solid line) shown in FIG. 2 with charging data (indicated by a broken line) for a degraded secondary battery.

More specifically, if the number of occurrences of charging operation reaches the number corresponding to the end period of life span of the battery pack 4, the changing unit 9 rewrites the control voltages (V1 through V3 indicated by a solid line in FIG. 3) corresponding to the temperature zones of the charging data stored in the storage unit 7 to become low voltage values (V4 through V6 indicated by a broken line in FIG. 3). By rewriting the control voltages based on the number of occurrences of charging operation corresponding to the end period of life span of the battery pack 4, the charging data is modified in conformity with the degree of degradation of the battery cell in such a way as to prevent occurrence of overcharging by reducing the electric charges accumulated in the battery pack 4.

Accordingly, it becomes possible to prevent overcharging of the aging-degraded battery pack 4, which in turn makes it possible to reliably further prevent occurrence of trouble, e.g., damage, of the battery pack 4 and reduction of the battery life span otherwise caused by the overcharging. In particular, the changed charging data is stored in the storage unit 7. Therefore, even if the battery pack 4 is attached to a battery charger having no rewriting function after the change of the charging data, it is possible to perform the charging by use of the changed charging data stored in the storage unit 7 and thus overcharging of the battery pack 4 with the degraded secondary batteries 5 can be prevented.

Since the charging data stored in the storage unit 7 is rewritten by the changing unit 9, it is possible to change the charging data according to the temperature of the secondary batteries 5 and the degree of degradation thereof, so that the appropriate charging can be performed according to the temperature and degradation state of the battery pack 4. Accordingly, the charging can be performed depending on the state of the battery pack 4 by, e.g., reducing the control voltage and the accumulated amount of electric charges even with respect to the battery pack 4 provided with no charging data corresponding to the temperature and degradation state thereof. This assists in preventing overcharging of the battery pack 4. As a consequence, it is possible to prevent occurrence of trouble, e.g., damage, even in the battery pack 4 with no sufficient overcharging protection, which would otherwise be caused by the overcharging. This helps improve the safety, prevent reduction of the battery life span and enhance the ease of use.

In particular, if the storage unit 7 has an extra storage capacity, the charging data stored in the storage unit 7 can be expanded by, e.g., increasing the number of control voltages and replenishing new operation programs, so that new charging operations missing in the previously stored charging data can be added. Addition of the new charging operations to the charging data makes it possible not only to prevent the overcharging but also to perform the charging control suppressing temperature increase during the charging operation due to, e.g., the temperature or degradation of the battery pack 4. This helps further enhance the safety and the ease of use.

Since the changing unit 9 performs the change of the charging data using the charging data stored in the storage unit 7, it is possible to prevent the change of the charging data from becoming contradictory to the charging data changed in the past according to the degree of degradation or the like. This helps prevent occurrence of defects in the changed charging data, thereby making it possible to reliably prevent the overcharging and to further enhance the safety.

The changed charging data is left in the battery pack 4 because the charging data stored in the storage unit 7 is rewritten by the changing unit 9. Therefore, even when trouble such as damage or the like occurs in the charging data stored in the storage unit 7, the charging data can be easily corrected by attaching the battery pack 4 to the battery charger 1 having the changing unit 9 of the present embodiment. This helps enhance the ease of maintenance.

Since the changing unit 9 is provided in the battery charger 1 having the control unit 2, the changing unit 9 is free from the in-use influence of an electric power tool such as the motor vibration or the like. This makes it possible to prevent occurrence of trouble, e.g., damage, in the changing unit 9 during the course of using the electric power tool, which assists in prolonging the life span of the charging circuit. Further, the operation circuit of the control unit 2 performing the charging control, which is more complex than the operation process performed by the monitoring unit 6, can be used to partially perform the operation of the changing unit 9. This makes it possible to simplify the configuration of the changing unit 9, thereby suppressing an increase in cost.

Further, the storage unit 7 may have a large storage capacity, so that a plurality of charging data can be stored therein. In this case, one charging data to be used in a charging operation may be previously set in the storage unit 7 among the plurality of charging data, and the changing unit 9 may replace the preset charging data with another charging data.

Specifically, the storage unit 7 stores a plurality of charging data, a preset charging data, selected among the plurality of charging data, for use in a charging operation and a preset switching condition. The switching condition refer to, e.g., timing data by which the preset charging data for use in the charging operation is switched to one of the plurality of charging data if certain condition is satisfied. The switching condition may be, e.g., the number of occurrences of charging operation arriving at the end period of life span.

The changing unit 9 can replace the charging data with another one by performing the switching of the charging data regardless of the switching condition. For example, when the battery pack 4, which undergoes a temperature abnormality at the number of occurrences of charging operation less than the one mentioned above, is attached to the battery charger 1, the changing unit 9 receives the detected temperature of the secondary batteries 5 through the monitoring unit 6 and the control unit 2 and replaces the preset charging data to charging data with a low control voltage for use in the end period of life span, thereby preventing occurrence of overcharging on the occasion of temperature abnormality.

In other words, the changing unit 9 can replace the preset charging data regardless of the switching condition stored in the battery pack 4 and freely switches among the plurality of charging data. This makes it possible to perform an overcharging-free charging task with respect to the battery pack 4 undergoing a temperature abnormality which is not found in the switching condition or impossible to cope with.

Further, even in case where the battery pack 4 previously subjected to charging under the temperature abnormality is attached to the battery charger 1 at a normal temperature, the changing unit 9 can replace the currently set charging data adapted for use in the end period of life span with charging data having a relatively higher control voltage adapted for use before the end period of life span. This helps prevent occurrence of a problem of using the previously set charging data having a relatively lower control voltage and, consequently, charging the battery pack 4 in an amount smaller than a safely chargeable amount. Therefore, it is possible to reliably charge the battery pack 4 up to the safely chargeable capacity limit, which assists in enhancing the ease of use.

When a battery pack with a storage unit having a large storage capacity but storing only one charging data is attached to the battery charger 1 provided with the changing unit 9 of the present embodiment, a plurality of charging data to be used later may be stored in the storage unit by the changing unit 9, one of which is selected and set as an in-use charging data. In addition, switching conditions may be stored in the storage unit by the changing unit 9.

Figure 4:
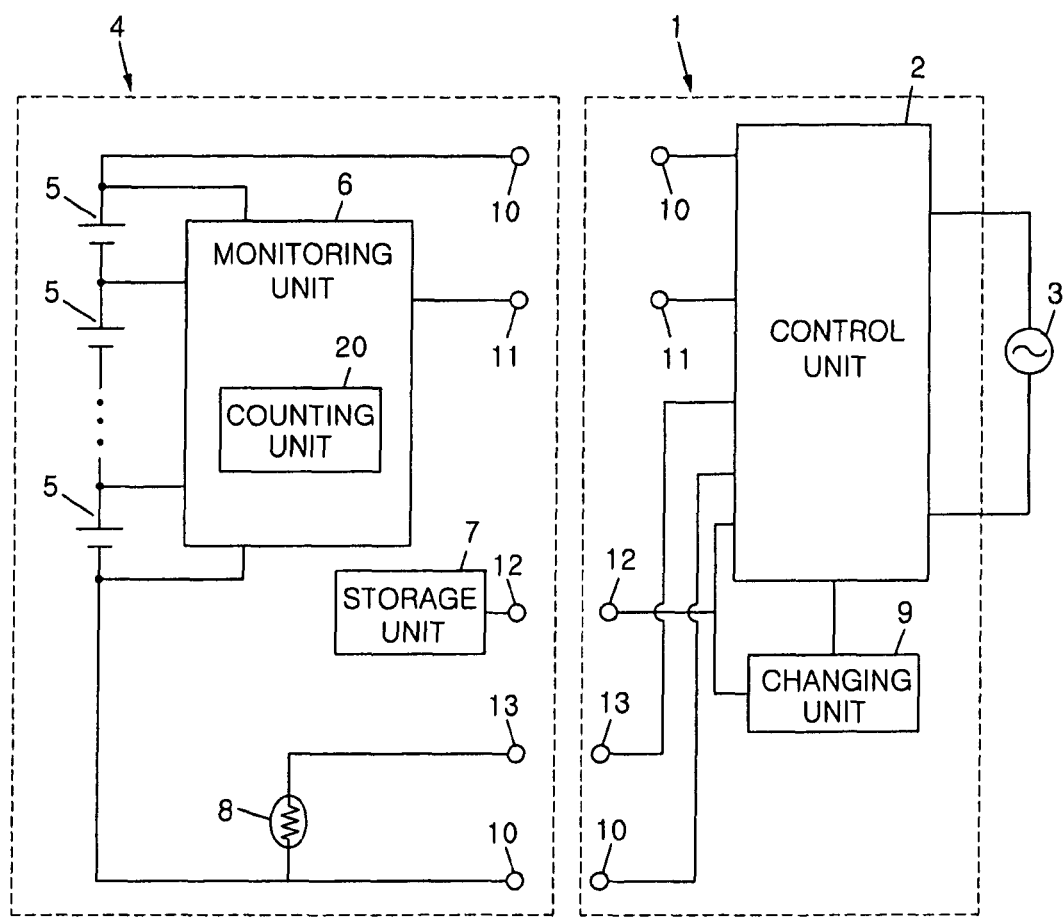
FIG. 4 is a circuit diagram showing a modification of the charging circuit shown in FIG. 1.

Referring to FIG. 4, there is provided a modified example of the charging circuit of the first embodiment in which the temperature detection unit 8 outputs a temperature detection signal corresponding to the detected temperature to the control unit 2 through a temperature connector 13. Like reference numerals will be given to like parts as in the foregoing embodiment, and description thereof will be omitted.

In this charging circuit, the temperature detection signal corresponding to the temperature detected by the temperature detection unit 8 is outputted to the control unit 2, rather than the monitoring unit 6, through a temperature connector 13 of each of the battery charger 1 and battery pack 4. Therefore, the control unit 2 performs the charging interruption control or the like when the battery pack 4 is overheated by heat generation in the charging operation.

In this modification, the changing unit 9 generates new charging data according to the detected temperature outputted to the control unit 2 and writes the new charging data in the storage unit 7, thereby changing the pre-stored charging data. For example, when starting the charging operation, the temperature detection unit 8 detects the temperature of the secondary batteries 5 and outputs a temperature detection signal corresponding to the detected temperature to the control unit 2. The detected temperature outputted to the control unit 2 is received by the changing unit 9. The changing unit 9 writes a new control voltage corresponding to the detected temperature in the storage unit 7, thereby changing the charging data.

More specifically, the changing unit 9 determines a plurality of control voltages for different temperatures, regardless of the temperature stored in the storage unit 7, and selects one control voltage corresponding to the detected temperature from the plurality of control voltages. Then, the changing unit 9 generates new charging data based on the selected control voltage and overwrites same in the storage unit 7, thereby changing the in-use charging data to be used in the charging operation.

In other words, the changing unit 9 overwrites the new charging data on the charging data previously stored in the storage unit 7. Accordingly, the number of the control voltages is not changed before and after the change of the charging data, which means that the quantity of the charging data stored in the storage unit 7 remains unchanged. Therefore, it is possible to change the charging data within the storable capacity of the storage unit 7 even if the storage unit 7 has a storage capacity covering only the pre-stored charging data.

In case where the storage unit 7 has an extra storage capacity, the changing unit 9 may change the charging data by setting control voltages in a corresponding relationship with the respective temperature zones and adding an operation program for selecting one of the control voltages. In this case, the control unit 2 may perform the operation of selecting one of the control voltages.

Figure 5:
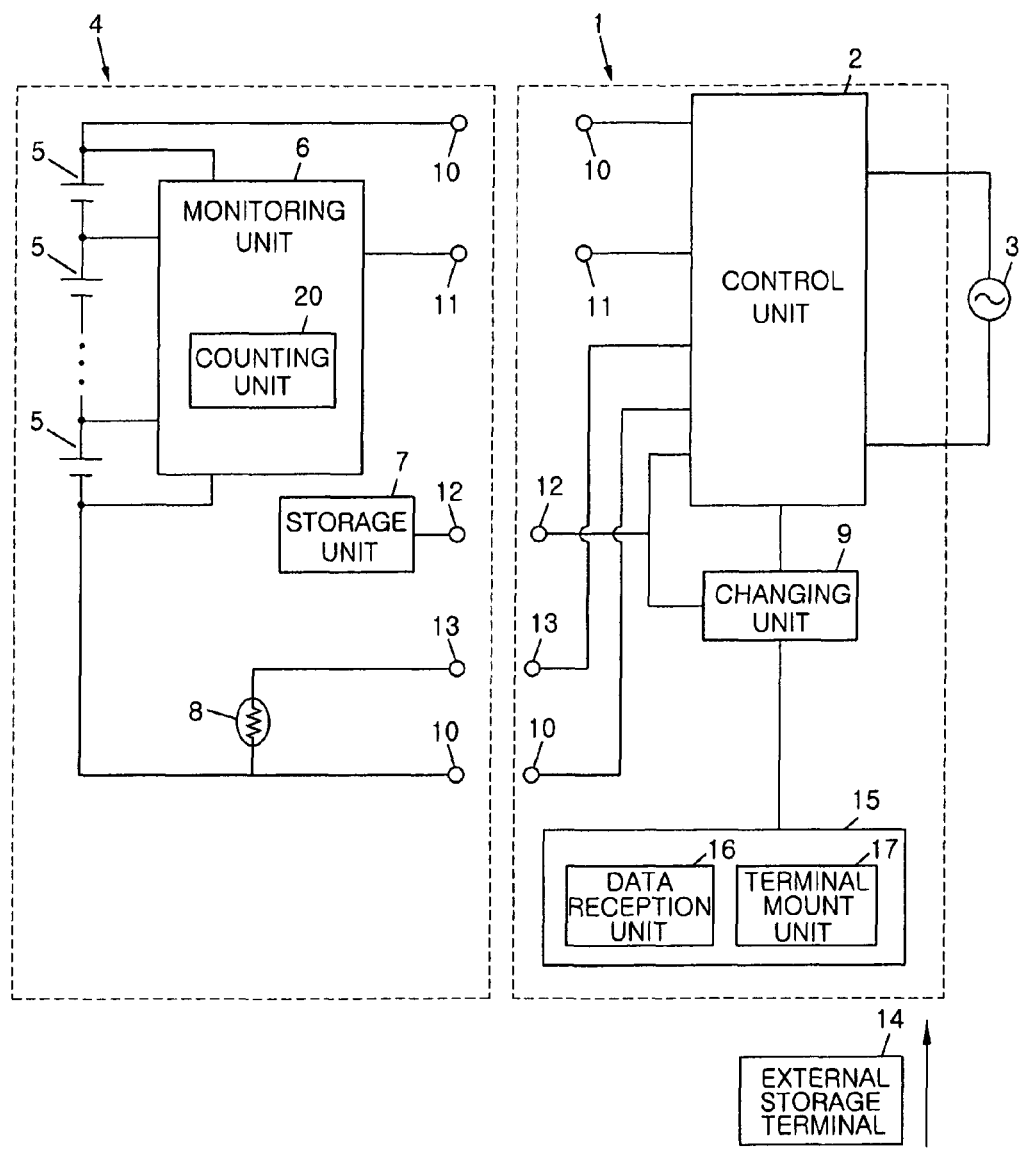
FIG. 5 is a circuit diagram showing a charging circuit in accordance with a second embodiment of the present invention.

Referring to FIG. 5, there is provided a charging circuit in accordance with a second embodiment of the present invention, in which the battery charger 1 is provided with an external connector 15 to which an external storage terminal 14 can be detachably attached. Like reference numerals will be given to like parts as in the two examples of the first embodiment, and description thereof will be omitted.

The external storage terminal 14 stores changing data to be used in changing the charging data by the changing unit 9. The external connector 15 includes a data reception unit 16 through which the changing data stored in the external storage terminal 14 is received and a terminal mount unit 17 to which the external storage terminal 14 is removably mounted. If the external storage terminal 14 is mounted to the external connector 15, the external connector 15 receives the changing data stored in the external storage terminal 14 and outputs the received changing data to the changing unit 9. The changing unit 9 calculates and generates new charging data using the received charging data and writes the new charging data in the storage unit 7, thereby changing the in-use charging data stored in the storage unit 7.

In other words, the storage unit which stores the changing data to be used in changing the charging data by the changing unit 9 is removably mounted to the battery charger 1. Therefore, the contents of the new charging data generated by the changing unit 9 can be easily changed to other contents by changing the changing data stored in the external storage terminal 14. This makes it possible to have the new charging data exactly correspond to the temperature and degradation state of the battery pack 4, which assists in enhancing the safety and the ease of use.

The external storage terminal 14 is preferably a compact and lightweight storage terminal formed in a case of card shape or rectangular shape. Therefore, the terminal mount unit 17 has reduced restrictions in the position or mounting direction and enjoys an increased freedom of design, which makes it possible to enhance the ease of use. Further, the terminal mount unit 17 may not be provided in the charging circuit and, instead, the external storage terminal 14 may be electrically connected to the data reception unit 16 through infrared communication or the like, in which case there is no need to hold the external storage terminal 14 in the battery charger 1 by mechanical connection such as mounting or the like.

The changing data is the combination of the data for changing the control voltages, e.g., an equation for calculation of the control voltages or correction values, and the data for changing the charging settings, e.g., the increasing rate of the current supplied in the charging operation or the switching timing to the constant-voltage charging. Further, the changing data stored in the external storage terminal 14 may correspond to charging data to be stored in the storage unit 7. For example, in case of the battery pack 4 whose battery cell is in a degraded state, the changing data may be new charging data for the battery pack 4 in such state and is stored in the storage unit 7. This makes it possible to omit the charging data calculation operation of the changing unit 9, thus simplifying the configuration of the charging circuit. Moreover, the external storage terminal 14 may include a plurality of charging data and a selection condition for selecting one of the charging data to be stored in the storage unit 7 from the plurality of charging data based on the detected temperature of the secondary batteries 5 or the like. In this case, the changing unit 9 may change the charging data by selecting and determining the in-use charging data to be used in the charging operation.

While the invention has been shown and described with respect to the embodiments, it will be understood by those skilled in the art that various changes and modification may be made without departing from the scope of the invention as defined in the following claims.

What is claimed is:

1. A charging circuit comprising:
   a battery pack provided with one or more secondary batteries;
   a battery charger for charging the secondary batteries, the battery pack being detachably attachable to the battery charger;
   a control unit for performing a charging control;
   a monitoring unit for detecting charged voltage of the secondary batteries to determine completion of charging;
   a storage unit storing charging data for use in the charging control of the control unit and determination of the charging completion of the monitoring unit; and
   a changing unit for changing the charging data,
   wherein the monitoring unit and the storage unit are arranged in the battery pack, and the changing unit and the control unit are arranged in the battery charger.

2. The charging circuit of claim 1, wherein the changing unit changes the charging data depending on a temperature of the secondary batteries of the battery pack.

3. The charging circuit of claim 1, wherein the charging data include a control voltage, which is an upper limit of the charged voltage used in the determination made by the monitoring unit, and charging settings for the charging control and the determination, the changing unit changing the charging data by adding a new charging control to the charging settings.

4. The charging circuit of claim 1, wherein the changing unit changes the charging data depending on the number of occurrences of charging operation of the battery pack.

5. The charging circuit of claim 1, further comprising a data reception unit for receiving changing data from outside therethrough, the changing unit changing the charging data using the changing data received through the data reception unit.

6. The charging circuit of claim 5, further comprising a terminal mount unit to which an external storage terminal storing the changing data is removably mounted, the data reception unit receiving the changing data from the external storage terminal mounted to the terminal mount unit.

7. The charging circuit of claim 1, wherein the control unit performs the charging control based on the charging data stored in the storage unit of the battery pack.

8. The charging circuit of claim 1, wherein the charging data include switching conditions under which the control unit switches an operation of the charging control and switching contents under the switching conditions.

9. The charging circuit of claim 2, wherein the charging data include a control voltage, which is an upper limit of the charged voltage used in the determination made by the monitoring unit, and wherein the changing unit adaptively changes the control voltage depending on the temperature of the secondary batteries of the battery pack.

10. The charging circuit of claim 4, wherein the charging data include a control voltage, which is an upper limit of the charged voltage used in the determination made by the monitoring unit, and wherein the changing unit changes the control voltage depending on the number of occurrences of charging operation of the battery pack.

* * * * *